(12) United States Patent
Gamble et al.

(10) Patent No.: US 10,296,440 B2
(45) Date of Patent: May 21, 2019

(54) MULTI-TENANT AWARE DEBUGGING METHODS AND SYSTEMS

(71) Applicant: salesforce.com, inc., San Francisco, CA (US)

(72) Inventors: Christopher David Gamble, Seattle, WA (US); Jonathan Widjaja, San Francisco, CA (US); Josh Kaplan, Orinda, CA (US); Kevin Carr, Lakewood, CA (US); Michael Boilen, Kirkland, WA (US); Nathan Edward Lipke, Denver, CO (US); Nicholas Chun Yuan Chen, San Francisco, CA (US); Steven Tamm, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 377 days.

(21) Appl. No.: 14/748,601

(22) Filed: Jun. 24, 2015

(65) Prior Publication Data

US 2016/0378637 A1 Dec. 29, 2016

(51) Int. Cl.
*G06F 11/36* (2006.01)

(52) U.S. Cl.
CPC ........ *G06F 11/362* (2013.01); *G06F 2201/80* (2013.01); *G06F 2201/81* (2013.01)

(58) Field of Classification Search
CPC ............... G06F 11/362; G06F 11/3604; G06F 2201/80; G06F 2201/81
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |

(Continued)

*Primary Examiner* — Loc Tran
(74) *Attorney, Agent, or Firm* — Lorenz & Kopf, LLP

(57) ABSTRACT

Methods and systems are provided for debugging application code in an on-demand multi-tenant database system. One exemplary method involves an application server receiving a request associated with application code in a database from a client device via a network, verifying that debugging associated with the request does not violate a debugging utilization criterion, and after verifying that debugging associated with the request does not violate the debugging utilization criterion, accessing the application code in the database in conjunction with the request.

20 Claims, 6 Drawing Sheets

(56) References Cited

U.S. PATENT DOCUMENTS

| | | |
|---|---|---|
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,170,922 B1* | 10/2015 | Lachwani ............ G06F 11/3636 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian P et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0177421 A1* | 9/2003 | Baker .................. G06F 11/3624 714/48 |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2009/0183142 A1* | 7/2009 | Hoban ................ G06F 11/3664 717/125 |
| 2011/0247051 A1 | 10/2011 | Bulumulla et al. |
| 2012/0042218 A1 | 2/2012 | Cinarkaya et al. |
| 2012/0102463 A1* | 4/2012 | Bates .................... G06F 11/362 717/125 |
| 2012/0131555 A1* | 5/2012 | Hossain ................ G06F 11/362 717/124 |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2015/0222507 A1* | 8/2015 | Choy .................. H04L 43/0811 370/252 |
| 2015/0341341 A1* | 11/2015 | Messerges ............ H04L 9/3297 713/151 |
| 2015/0347274 A1* | 12/2015 | Taylor .................... G06F 11/362 717/125 |

\* cited by examiner

MULTI-TENANT AWARE DEBUGGING METHODS AND SYSTEMS

TECHNICAL FIELD

Embodiments of the subject matter described herein relate generally to computer systems, and more particularly, to methods and systems for debugging in an on-demand multi-tenant computing system.

BACKGROUND

Modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" or "on-demand" by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users. For example, a multi-tenant system may support an on-demand customer relationship management (CRM) application that manages the data for a particular organization's sales staff that is maintained by the multi-tenant system and facilitates collaboration among members of that organization's sales staff (e.g., account executives, sales representatives, and the like).

One drawback associated with an on-demand multi-tenant system is the difficulty of debugging code developed for execution by the system. System logs often must be truncated due to maximum size restrictions, and it can be difficult and unwieldy, if not impossible, to generate a local representation of a database system that supports thousands or millions of users associated with different organizations and utilizes load balancing to direct requests to particular servers at run-time. Furthermore, access restrictions must be maintained with respect to protected data or code, which may further constrain the ability to create a local representation of the system. Alternatively, providing unfettered debugging access to the system risks unauthorized access to data or code that should be protected in addition to potentially impairing the user experience across the system.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Embodiments of the subject matter described herein generally relate to methods and systems for debugging application code in an on-demand multi-tenant database system. However, it should be noted that although the subject matter is described herein in the context of on-demand multi-tenant database system for purposes of explanation, the subject matter is not necessarily so limited, and in practice, may be implemented in an equivalent manner in any number of different database systems, cloud computing systems, and the like.

As described in greater detail below, in exemplary embodiments, a server in the on-demand multi-tenant database system receives requests pertaining to new or existing debugging sessions and verifies whether debugging associated with the requests violates one or more applicable debugging utilization criteria that limit or otherwise restrict debugging within the system. When debugging associated with the request will not violate the applicable debugging utilization criteria, then the server accesses at least a portion of the application code associated with the debugging user's associated tenant that is stored by the database system. For example, the server may establish or otherwise instantiate a new debugging session corresponding to the request as being active within the system and allow insertion of breakpoints within application code that is stored by the database system and associated with the debugging user's associated tenant in accordance with the permissions associated with the user and/or the user's tenant. For a client request corresponding to an active debugging session, the debugger associated with the active debugging session is notified when a breakpoint is reached within the tenant's application code and provided with debugging execution information (e.g., code segments, data values, variable values, execution logs, and/or the like) pertaining to the current state of execution of the client request.

As described below primarily in the context of FIGS. 3-4, the active debug session is associated with the server that initially received and processed the matching client request, so that the debugger is capable of stepping through execution of the application code on that same server. At the same time, the debugger is subject to the permissions or other access limitations imposed by the multi-tenant system, so that the debugger is unable to access data associated with other tenants, data that is not viewable to the user associated with the debugger, or application code associated with the multi-tenant platform or other third-party code. The debug session may also subject to one or more debugging utilization criteria that limit or otherwise restrict performing debugging within the system so that an active debug session does not impair performance with respect to other users within the system.

Figure 1:
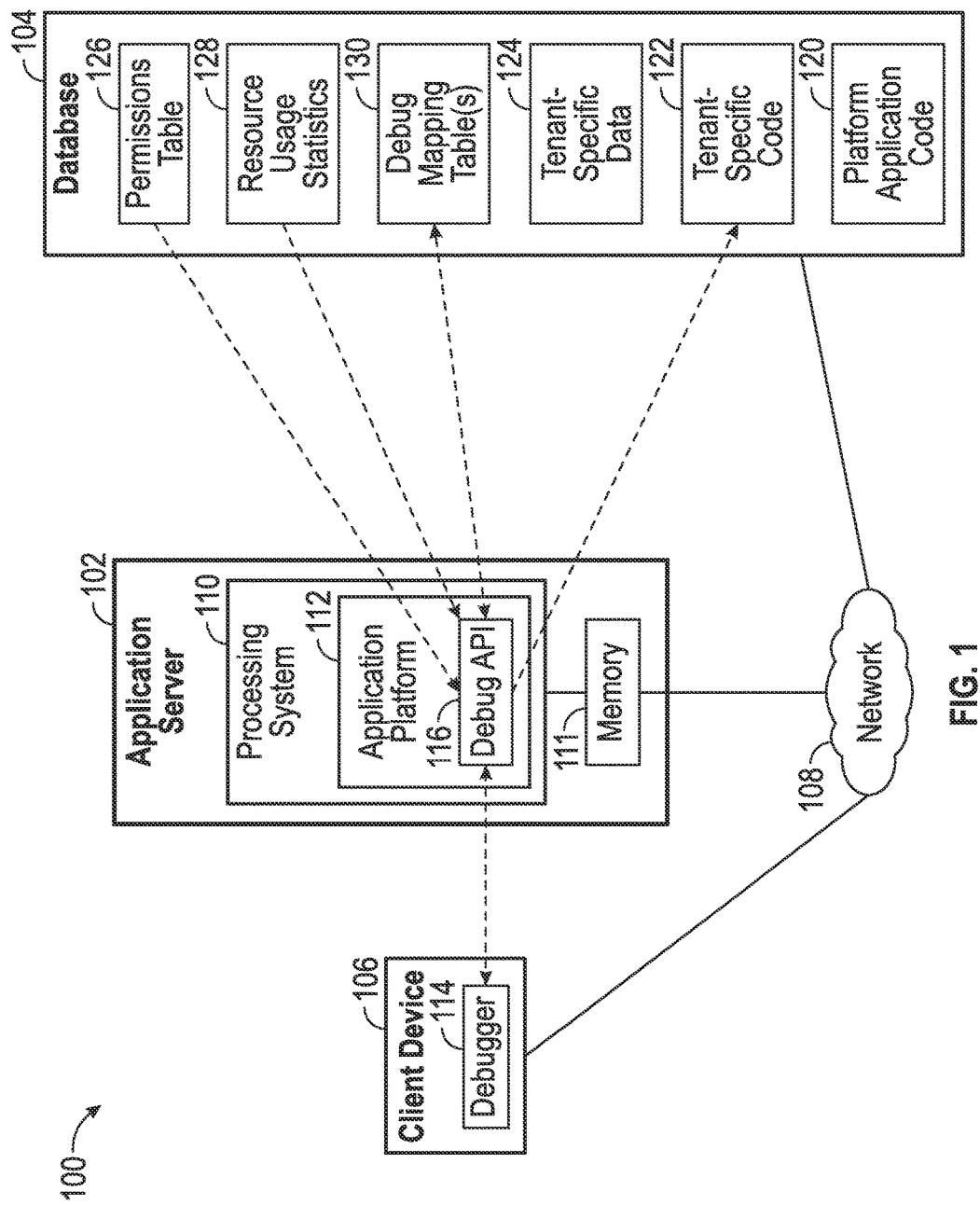
FIG. 1 is a block diagram of an exemplary on-demand multi-tenant database system.

Turning now to FIG. 1, an exemplary on-demand multi-tenant database system 100 includes an application server 102 that includes or otherwise implements an application platform 112 capable of generating one or more instances of a virtual application at run-time (or "on-demand") provided to one or more client devices 106 communicatively coupled to the application server 102 via a communications network 108, such as a wired and/or wireless computer network, a cellular network, a mobile broadband network, a radio network, or the like. The application server 102 generates the virtual application(s) based at least in part upon platform application code 120 and other data stored or otherwise maintained by a database 104 that is communicatively coupled to the application server 102 via the communications network 108. In this regard, the application server 102 and the database 104 cooperatively provide a cloud computing platform (or framework), as described in greater detail below in the context of FIGS. 3 and 6.

It should be understood that FIG. 1 is a simplified representation of an on-demand multi-tenant database system 100 provided for purposes of explanation and is not intended to limit the subject matter described herein. In practice, the on-demand multi-tenant database system 100 may include a plurality of instances of the application server 102 behind a load balancer, which manages the utilization of the respective application servers in a manner that achieves a desired level of performance for the system 100. Although FIG. 1 depicts the client device 106 communicating on the same network 108 that the application server 102 and the database 104 communicate on, in practice, the client device 106 and the application server 102 may communicate via a communications network that is logically separate and/or distinct from the network 108. For example, the client device 106 could communicate with the application server 102 via a cellular network or the Internet, while the load balancer, the application servers 102, and/or the database 104 communicate via a local area network (LAN) behind a firewall, or the like.

In accordance with one or more embodiments, the database 104 is realized as a multi-tenant database that is shared between multiple tenants, with each tenant having its own set of associated users, its own associated data 124 that is logically separate or otherwise isolated from data belonging to other tenants, and its own associated application code 122 that may be integrated with the platform code 120 to provide a customized tenant-specific user experience for users associated with that tenant. In this regard, the database 104 stores or otherwise maintains data and/or code associated with a number of different tenants and restricts each tenant's access to other tenants' data (or alternatively, restricts accessibility of each tenant's data with respect to other tenants), for example, as described in greater detail below in the context of FIG. 6.

In the illustrated embodiment of FIG. 1, the application server 102 generally represents a computing system or another combination of processing logic, circuitry, hardware, and/or other components configured to support the debugging processes, tasks, operations, and/or functions described herein. In this regard, the application server 102 includes a processing system 110, which may be implemented using any suitable processing system and/or device, such as, for example, one or more processors, central processing units (CPUs), controllers, microprocessors, microcontrollers, processing cores and/or other hardware computing resources configured to support the operation of the processing system 110 described herein. The processing system 110 may include or otherwise access a data storage element 111 (or memory) capable of storing programming instructions for execution by the processing system 110, that, when read and executed, cause processing system 110 to create, generate, or otherwise facilitate the application platform 112 that generates or otherwise provides instances of the virtual application at run-time (or "on-demand") based at least in part upon platform application code 120 and other data that is stored or otherwise maintained by the database 104. Depending on the embodiment, the memory 111 may be realized as a random access memory (RAM), read only memory (ROM), flash memory, magnetic or optical mass storage, or any other suitable non-transitory short or long term data storage or other computer-readable media, and/or any suitable combination thereof.

The client device 106 generally represents an electronic device coupled to the network 108 that may be utilized by a user to access the application platform 112 on the application server 102. In practice, the client device 106 can be realized as any sort of personal computer, mobile telephone, tablet or other network-enabled electronic device that includes a display device, such as a monitor, screen, or another conventional electronic display, capable of graphically presenting data and/or information provided by the application platform 112 along with a user input device, such as a keyboard, a mouse, a touchscreen, or the like, capable of receiving input data and/or other information from the user of the client device 106.

A user manipulates the client device 106 to execute a debugger 114 (or debugging tool) that contacts the application server 102 and/or application platform 112 using a networking protocol, such as the hypertext transport protocol (HTTP) or the like, to interact with a debug application programming interface (API) 116 that supports the debugging processes and related tasks, operations, and/or functions described herein. In this regard, the user utilizes the debugger 114 to generate or otherwise provide debug session requests to the debug API 116, which, in turn, accesses the database 104 and verifies that a debug session request is allowable before allowing the debugger 114 to access the database 104 and insert breakpoints into the application code 122 associated with the debugging user's tenant.

Figure 2:
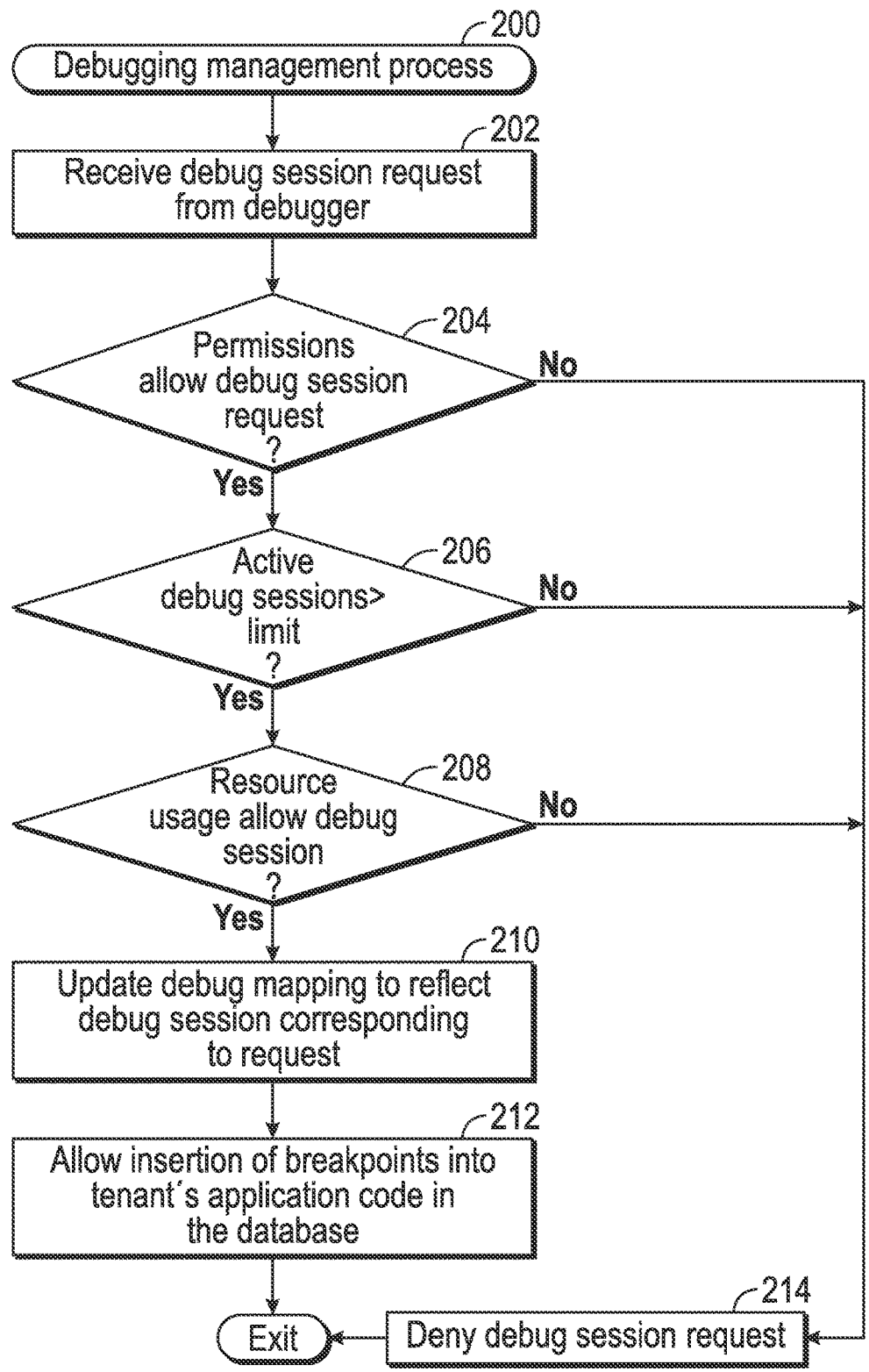
FIG. 2 is a flow diagram of an exemplary debugging management process suitable for implementation by the on-demand multi-tenant database system of FIG. 1 in accordance with one or more embodiments.

FIG. 2 depicts an exemplary embodiment of a debugging management process 200 suitable for implementation by an application server to manage debug requests in an on-demand multi-tenant database system. For illustrative purposes, the following description may refer to elements mentioned above in connection with FIG. 1. In practice, portions of the management process 200 may be performed by different elements of the on-demand database system 100, such as, for example, the application server 102, the database 104, the processing system 110, the application platform 112, the debug API 116, the debugger 114, the platform application code 120 and/or the tenant-specific application code 122. It should be appreciated that the management process 200 may include any number of additional or alternative tasks, the tasks need not be performed in the illustrated order and/or the tasks may be performed concurrently, and/or the management process 200 may be incorporated into a more comprehensive procedure or process having additional functionality not described in detail herein. Moreover, one or more of the tasks shown and described in the context of FIG. 2 could be omitted from a practical embodiment of the management process 200 as long as the intended overall functionality remains intact.

Referring now to FIGS. 1-2, in exemplary embodiments, the management process 200 begins by receiving a debug session request from a debugger and identifying or otherwise determining whether permissions associated with the user associated with the debug session request allow the user to perform debugging within the system (tasks 202, 204). For example, when the user of the client device 106 manipulates the debugger 114 to start a debug session, the debugger 114 may transmit or otherwise provide a corresponding debug session request to the debug API 116 that also includes login information or other authentication information associated with the user of the client device 106, such as, for example, one or more unique identifiers associated with the user (e.g., a username or other user ID, a password, or the like), a unique identifier associated with the user's tenant, and the like. In response, the application platform 112 and/or the debug API 116 utilizes the authentication information to verify that the user is an authorized user within the system 100, and further, verify that the user is authorized to perform debugging within the system 100 based on permissions associated with the user in one or more permissions tables 126 in the database 104. In this regard, the permissions table 126 may identify or otherwise indicates which tenants of the plurality of tenants supported by the system 100 are allowed to create debugging sessions on the system 100, and additionally, which users associated with those tenants are allowed to initiate those debugging sessions. Thus, the debug API 116 verifies that the requesting user's tenant is authorized to perform debugging sessions within the system 100, and also verifies the user is also authorized to create those debugging sessions. When either the user or the user's tenant is not authorized to perform debugging on the system 100, the management process 200 denies the debug session request and prevents the debugger 114 from inserting breakpoints in the tenant-specific application code 122 on the database 104 or otherwise accessing or debugging any aspects of the system 100.

After verifying the debug session request is authorized, the management process 200 verifies or otherwise determines whether the debug session request violates any applicable debugging utilization criteria. In the illustrated embodiment, the management process 200 verifies or otherwise determines whether a number of currently active debug sessions associated with the requesting user or the requesting user's tenant would be greater than a maximum allowable number of concurrent debug sessions for that user or tenant (task 206). In this regard, the permissions table 126 may maintain, in association with each particular tenant and/or user allowed to perform debugging, a maximum number of concurrent active debug sessions that may be associated with that tenant and/or user. When a new debug session request is received, the debug API 116 accesses a debug mapping table 130 in the database 104 that tracks active debug sessions and verifies or otherwise confirms that creating a new debugging session responsive to the request in combination with the currently active debugging sessions associated with the requesting user (or alternatively, the requesting user's tenant) will not exceed the maximum number of concurrent active debugging sessions provided by the permissions table 126 for that user (or tenant). In some embodiments, an administrator of the system 100 may impose a maximum number of concurrent active debugging sessions that may be associated with any user or tenant, with the debug API 116 verifying or otherwise confirming that the new debug session request in combination with the currently active debugging sessions associated with the requesting user or the requesting user's tenant will not exceed the applicable maximum number of concurrent active debugging sessions.

Additionally, the management process 200 verifies or otherwise determines that the current usage of the on-demand multi-tenant system resources allows for a new debugging session to be created (task 208). In this regard, the debug API 116 accesses a resource usage statistics table 128 in the database 104 that includes values for one or more resource usage metrics, which, in turn, are utilized by the debug API 116 to determine whether new debug sessions may be created. For example, the system 100 may track or otherwise monitor the relative allocation of application server resources to active debugging sessions and store or otherwise maintain a current debug resource usage metric in the resource usage statistics table 128. When the value for the current debug resource usage metric exceeds a maximum allowable threshold value for debugging within the system 100, the debug API 116 may determine that the new debugging session is not allowable and deny the debug session request (task 214). In this manner, the debug API 116 may prevent new debugging sessions from being created when an undesirably large percentage of the overall system resources are already allocated to debugging sessions.

Similarly, the system 100 may track or otherwise monitor the overall usage of application server resources and store or otherwise maintain a current system resource usage metric in the resource usage statistics table 128, with the debug API 116 denying the debug session request when the current system resource usage metric exceeds a maximum allowable threshold value. Thus, new debugging sessions may be prevented from being created when a large percentage of the overall system resources are currently being utilized and further utilization of resources for new debugging sessions may degrade the user experience for other users. Additionally, in various embodiments, the system 100 may track or otherwise monitor the relative allocation of application server resources to the requesting user or the requesting user's tenant, and the debug API 116 may deny the debug session request when the current resource usage by the requesting user or the requesting user's tenant exceeds a threshold value. In this manner, the debug API 116 may prevent a particular user or tenant from consuming a disproportionate percentage of the overall system resources.

After verifying the new debug session request does not violate any applicable debugging utilization criteria, the management process 200 continues by updating the debug mapping table in the database to instantiate or otherwise reflect a new active debugging session associated with the debug session request and thereafter allowing the debugger access to the tenant-specific application code in the database for inserting breakpoints into the code for purposes of the debugging session (tasks 210, 212). In this regard, the debug API 116 creates a new entry in the debug mapping table 130 in the database 104 for a debugging session corresponding to the received debug session request that maintains an association between the user of the client device 106, the tenant associated with the user, and the tenant's application code 122 to which the debug request pertains. The debug API 116 may also associate a network address associated with the client device 106 with the debugging session to facilitate pushing or otherwise providing notifications or other execution information to the debugger 114, as described in greater detail below in the context of FIGS. 3-4. Thereafter, the user may utilize the debugger 114 to insert breakpoints at desired locations within the user's tenant's application code 122. In some embodiments, the database 104 may include a breakpoint table maintaining information for managing breakpoints inserted tenant application code 122, with the breakpoint table being updated to include one or more entries associated with the debugging session that indicate or otherwise identify the location(s) of the breakpoint(s) within the debugging user's tenant's application code 122 in association with one or more identifiers associated with the debug request, the debugging user, and the like.

Figure 3:
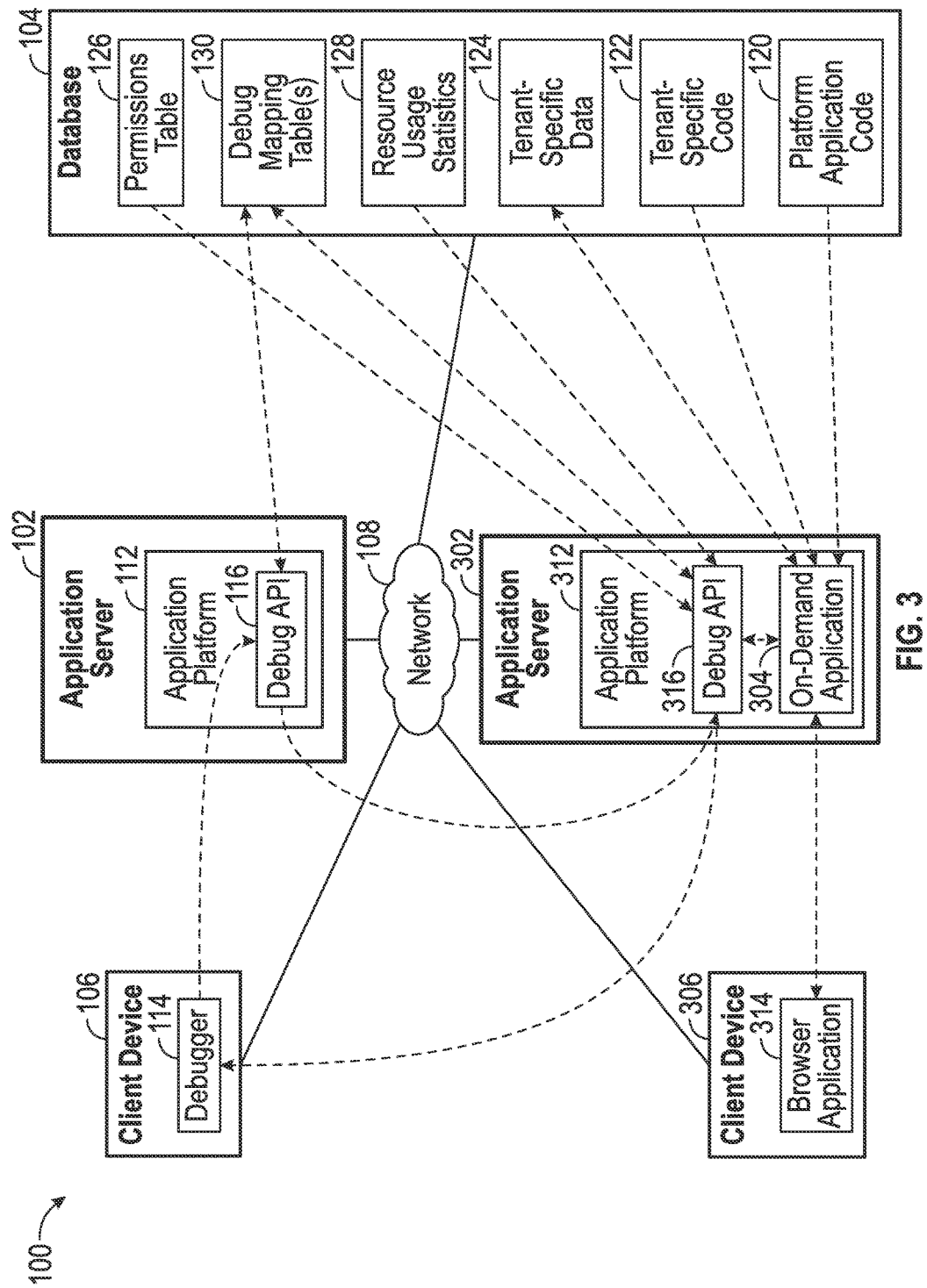
FIG. 3 is a block diagram illustrating on-demand debugging within the on-demand multi-tenant database system of FIG. 1 in accordance with one or more exemplary embodiments.

FIG. 3 depicts an exemplary embodiment of the on-demand multi-tenant database system 100 of FIG. 1 supporting real-time interactive debugging of an instance of an on-demand database application 304 that is generated at run-time and provided to a client device via a communications network 108. Various elements of FIG. 3 are similar to those described above in the context of FIG. 1, and such common features, functionality, and the like will not be redundantly described in the context of FIG. 3. As described above, the on-demand multi-tenant database system 100 includes a plurality of application servers 102, 302 that are capable of supporting any number of client devices 106, 306 having users associated with any number of tenants. In this regard, FIG. 3 depicts debugging of an instance of a virtual application 304 originally provided by an application server 302 to a client device 306 that is different from the client device 106 associated with the debugger 114. That said, it should be noted that in practice, the virtual application 304 being debugged may originally be provided to the same client device 106 as is executing the debugger 114.

Figure 4:
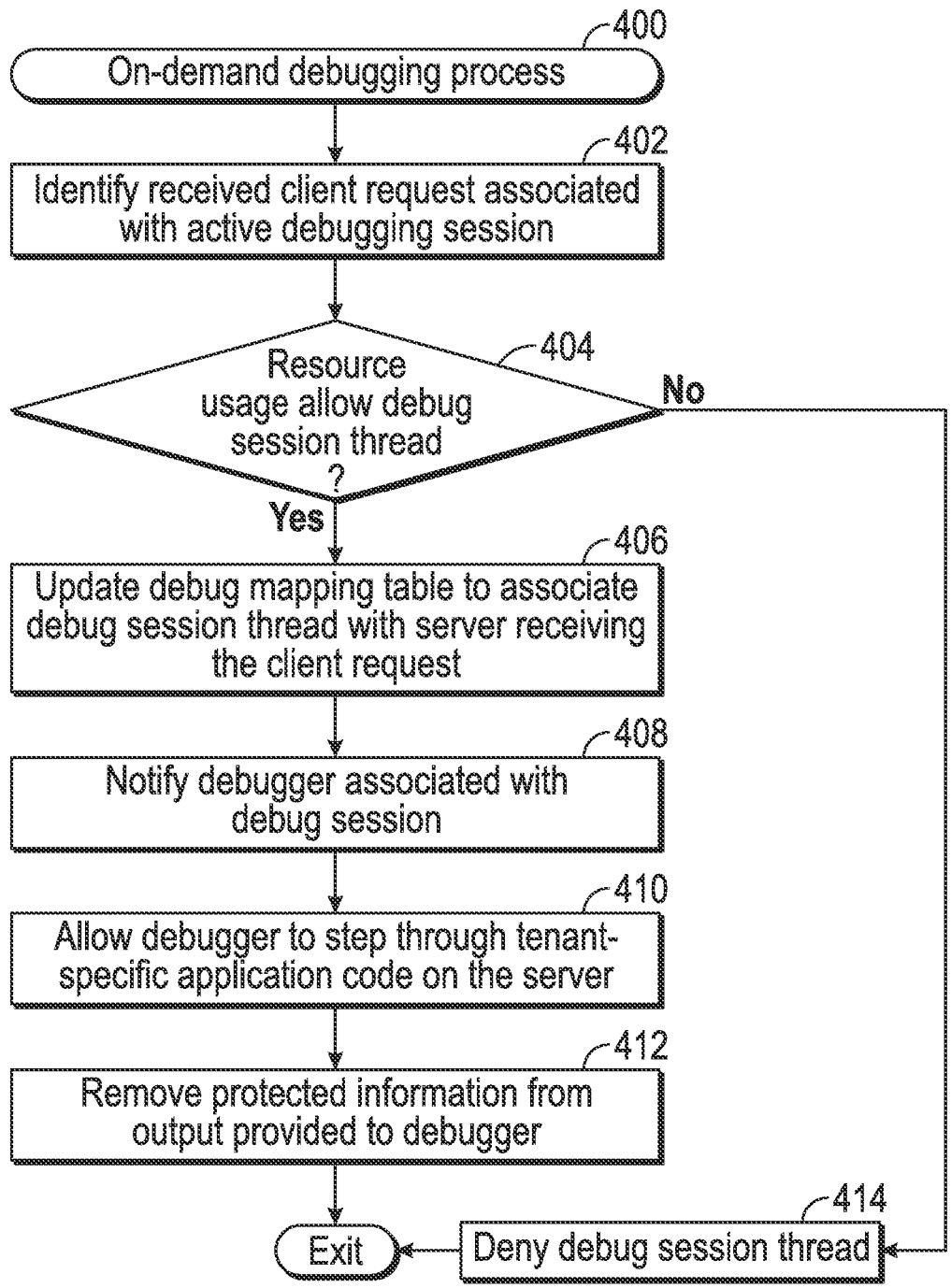
FIG. 4 is a flow diagram of an exemplary on-demand debugging process suitable for implementation by the on-demand multi-tenant database system of FIGS. 1 and 3 in accordance with one or more embodiments.

After an active debugging session associated with the user of the debugger 114 has been created within the system 100 and breakpoints have been inserted into the tenant-specific application code 122, the system 100 notifies the debugger 114 when one of the breakpoints is encountered during execution of the tenant-specific application code 122 in conjunction with the virtual application 304 and allows the debugger 114 to step through execution, as described in greater detail below in the context of FIG. 4. FIG. 3 depicts an embodiment where a user associated with the same tenant as the user associated with the client device 106 and/or debugger 114 manipulates another client device 306 to execute a client application 314, such as a web browser application, to request an instance of the virtual application 304 from the system 100. A load balancer associated with the system 100 may transfer or otherwise direct the client request to a particular application server 302. The application server 302 and/or application platform 312 accesses the database 104 to obtain or otherwise retrieve the platform application code 120, which includes computer-executable code segments, instructions, scripts or the like that are executed by the application server 302 to generate the virtual application 304 and/or the application platform 312. Additionally, based on the login information from the user of the client device 306, the application server 302 authenticates or otherwise identifies the user and integrates the application code 122, data 124, and/or other information associated with the user's tenant into the virtual application 304 at run-time in accordance with permissions associated with the user maintained by the permissions table 126. The virtual application 304 may include code, data and/or other dynamic web content provided to the client device 306 that is parsed, executed or otherwise presented by the client application 314 running on the client device 306.

In response to receiving a request from the client device 306, the debug API 316 accesses the debug mapping table 130 in the database 104 to detect or otherwise identify whether the request corresponds to an active debugging session. When the debug API 316 determines the received client request matches an active debugging session, the debug API 316 then verifies or otherwise determines whether creating a new debugging session thread associated with the active debugging session and the instance of the virtual application 304 will violate any applicable debugging utilization criteria. When creating a new active debugging session thread does not violate any debugging utilization criteria, the debug API 316 updates the debug mapping table 130 to instantiate an active debugging session thread associated with the application server 302 and notifies the debugger 114 associated with the active debugging session responsible for the new thread. Thereafter, the debugger 114 is allowed to view debugging execution information (e.g., code segments, data values, variable values, execution logs, and/or the like) corresponding to the current execution state of the virtual application 304 and step through execution of the virtual application 304 on the application server 302 in accordance with the client request. In this regard, by virtue of the association between the active debugging session thread and the application server 302, any debugging requests received from the debugger 114 pertaining to that active debugging session thread will be routed or otherwise directed to the application server 302. For example, when the load balancer directs a debugging request pertaining to the active debugging session thread to the application server 102, the debug API 116 accesses the debug mapping table 130 and determines that the request from the debugger 114 pertains to an instance of the virtual application 304 executing on the application server 302 and forwards or otherwise redirects the request to the application server 302 and/or the debug API 316 for further handling.

The debug API 316 responds to debugging execution requests from the debugger 114 and allows the user of the debugger 114 to step through execution of the virtual application 304 on the application platform 312. The debug API 316 provides information pertaining to the execution state of the virtual application 304 on the application platform 312 to the debugger 114, which, in turn, generates or otherwise provides a graphical representation of the debugging information on the client device 106. In exemplary embodiments, the debug API 316 utilizes the user identifier and tenant identifier associated with the user of the debugger 114 along with other permissions or access limitations provided by the permissions table 126 to filter, restrict, or otherwise limit the debugging execution information provided to the debugger 114. In this regard, while the debug API 316 may provide relevant portions of the debugging user's tenant's application code 122 and/or data 124 to the debugger 114, the debug API 316 redacts, filters, or otherwise removes protected information from what is provided to the debugger 114, such as, for example, portions of the platform application code 120 and/or other third-party code in the database 104 that may be integrated in the instance of the application 304. Additionally, in some embodiments, the debug API 316 may redact, filter, or otherwise remove portions of the tenant data 124 that should not be viewable to the debugging user based on the user's permissions or other criteria associated with those portions of the tenant data 124 (e.g., confidential data). The debug API 316 also prevents the debugger 114 from viewing or otherwise accessing data in the database 104 associated with other tenants, as well as viewing or otherwise accessing the platform application code 120 and/or other third-party code in the database 104.

FIG. 4 depicts an exemplary embodiment of an on-demand debugging process 400 suitable for implementation by an on-demand multi-tenant database system to allow interactive real-time debugging within the system. For illustrative purposes, the following description may refer to elements mentioned above in connection with FIGS. 1 and 3. In practice, portions of the debugging process 400 may be performed by different elements of the on-demand database system 100, such as, for example, one or more of the application servers 102, 302, the database 104, the debug APIs 116, 316, the debugger 114, the platform application code 120 and/or the tenant-specific application code 122. It should be appreciated that the debugging process 400 may include any number of additional or alternative tasks, the tasks need not be performed in the illustrated order and/or the tasks may be performed concurrently, and/or the debugging process 400 may be incorporated into a more comprehensive procedure or process having additional functionality not described in detail herein. Moreover, one or more of the tasks shown and described in the context of FIG. 4 could be omitted from a practical embodiment of the debugging process 400 as long as the intended overall functionality remains intact.

Referring to FIG. 4 with continued reference to FIGS. 1-3, the debugging process 400 begins by identifying or otherwise determining a request received from a client device that is associated with or otherwise corresponds to a debug session currently active within the on-demand multi-tenant database system (task 402). In this regard, for each received client request, the debug API 316 compares the associated tenant identifier, the portion of tenant-specific application code 122 invoked by the client request, and the like to the currently active debugging sessions maintained in the debug mapping table 130 (e.g., by querying the debug mapping table 130 using the associated tenant identifier and the like) detect or otherwise identify a client request that matches or otherwise corresponds to an active debugging session. In exemplary embodiments, the debug mapping table 130 stores or otherwise maintains a time associated with most recent activity associated with an active debugging session, and the debug APIs 116, 316 automatically terminate, cancel, or otherwise disregard any debugging sessions with recent activity that is not within a threshold period of time in advance of the current time. To put it another way, an active debugging session may timeout and the debugger 114 may be disabled or otherwise prevented from accessing the database 104 in conjunction with the debugging session when the threshold period of time has elapsed since the most recent activity without receiving a matching client request.

Thus, if the difference between a current time and the time of most recent activity associated with a debugging session is greater than the threshold period of time, the debug API 316 fails to identify or otherwise respond to a client request that matches that debugging session. In some embodiments, after the threshold period of time has elapsed, an active debugging session may be terminated or otherwise disabled by removing its corresponding entry from the debug mapping table 130.

In response to mapping or otherwise matching a client request to an active debugging session, the debugging process 400 continues by verifying or otherwise confirming that current resource usage allows for a new debugging session thread associated with the client request to be created and that the new debugging session thread will not violate any applicable debug utilization criteria (task 404). In a similar manner as described above in the context of management process 200, the debug API 316 accesses the resource usage statistics table 128 to verify that the current value(s) for any debug resource usage metric(s) is less than its applicable maximum allowable threshold value for debugging within the system 100. Additionally, the debug API 316 may verify that the current value(s) for any overall system resource usage metric(s) is less than its applicable maximum allowable threshold value for debugging within the system 100, and/or that the current value(s) for any resource usage metric(s) for the user and/or tenant associated with the matching active debugging session is less than its applicable maximum allowable threshold value. Additionally, the debug API 316 may access the debug mapping table(s) 130 to verify or otherwise confirm that the number of currently active debugging sessions associated with the requesting user or the requesting user's tenant is less than a maximum allowable number of concurrent debugging sessions (or concurrent debugging session threads) for that user or tenant. Thus, the debugging process 400 denies otherwise fails to create a new debugging session thread associated with the client request when the current usage of system resources is great enough that creating new debugging session threads may impair other users within the on-demand multi-tenant database system, or when the current usage of system resources by a particular user or tenant is disproportionately large (task 414).

After verifying that a new debugging session thread may be created, the debugging process 400 automatically creates a new debugging session thread associated with the client request by updating the debug mapping table to associated the client request with its corresponding active debugging session and notifying the debugger associated with that active debugging session of the new debug session (tasks 406, 408). The debug API 316 updates the debug mapping table 130 to include an entry for the debugging session thread that identifies or otherwise associates the received client request with the active debugging session. In this regard, the debug API 316 associates the new debug session thread with the client device 306 and/or the client application 314 from which the client request originated, the application server 302 and/or the application platform 312 that received the client request, and an identifier associated with the active debugging session and/or the debugger 114 associated with the active debugging session. Thereafter, the debug API 316 generates or otherwise provides a notification pertaining to the new debug session thread that is transmitted or otherwise provided to the debugger 114 by the application server 302 and/or the application platform 312 via the network 108. In one or more embodiments, the notification is generated whenever execution of the tenant-specific application code 122 associated with the debugging session thread by the application server 302 and/or application platform 312 encounters a breakpoint that stops or otherwise pauses execution of the virtual application 304.

Once a debugging session thread is created, the debugging process 400 enables or otherwise allows the debugger associated with the debugging session thread to step through execution of the tenant-specific application code on the application server (task 410). Additionally, the debugging process 400 transmits or otherwise provides code, data and/or other debugging execution information associated with the stepped-through execution of the tenant-specific application code to the debugger for review and analysis. In this regard, the debugging process 400 redacts or otherwise removes protected information from the debugging execution information that is provided to the debugger for rendering or presentation on the client device (task 412). In this regard, the debug API 316 filters or otherwise removes any portions of the platform application code 120 executed within the debugging session from the output provided to the debugger 114, as well as removing any protected third-party application code that is integrated with the tenant-specific application code 122. Additionally, the debug API 316 removes any portions of the tenant-specific data 124 that should not be viewable by the user associated with the debugger 114 along with any other protected data from the database 104 that is referenced or otherwise utilized by the tenant-specific application code 122.

As described above, the debugging session thread attributable to the client request is associated with the application server 302 that received the client request, so that subsequent requests received from the debugger 114 for stepping through execution of the tenant-specific application code 122 are executed or otherwise handled by the same application server 302. For example, as illustrated in FIG. 4, if the load balancer receives a debugging execution request associated with the debugging session thread from the debugger 114 and directs the request to the application server 102, the debug API 116 first accesses the debug mapping table 130 in the database 104 to confirm that its application server 102 is associated with that debugging session thread before handling the debugging execution request. Thus, when the debug API 116 accesses the debug mapping table 130 and identifies the debugging execution request from the debugger 114 is associated with a debugging session thread associated with the application server 302, the debug API 116 relays, retransmits, or otherwise provides the debugging execution request from the debugger 114 to the application server 302. Thereafter, the debug API 316 confirms the debugging execution request pertains to a debugging session thread associated with its application server 302 before commanding, instructing, or otherwise interacting with the application platform 312 and/or the virtual application 304 to resume performance of the client request by executing the tenant-specific application code 122 in accordance with the debugging execution request from the debugger 114. In this regard, the application server 302 and/or the application platform 312 may resume execution of the portion of the tenant-specific application code 122 following a breakpoint in response to the debugging execution request and provide the corresponding debugging execution information (after removing any protected information) to the debugger 114 for presentation on the client device 106 as a response to the debugging execution request.

Figure 5:
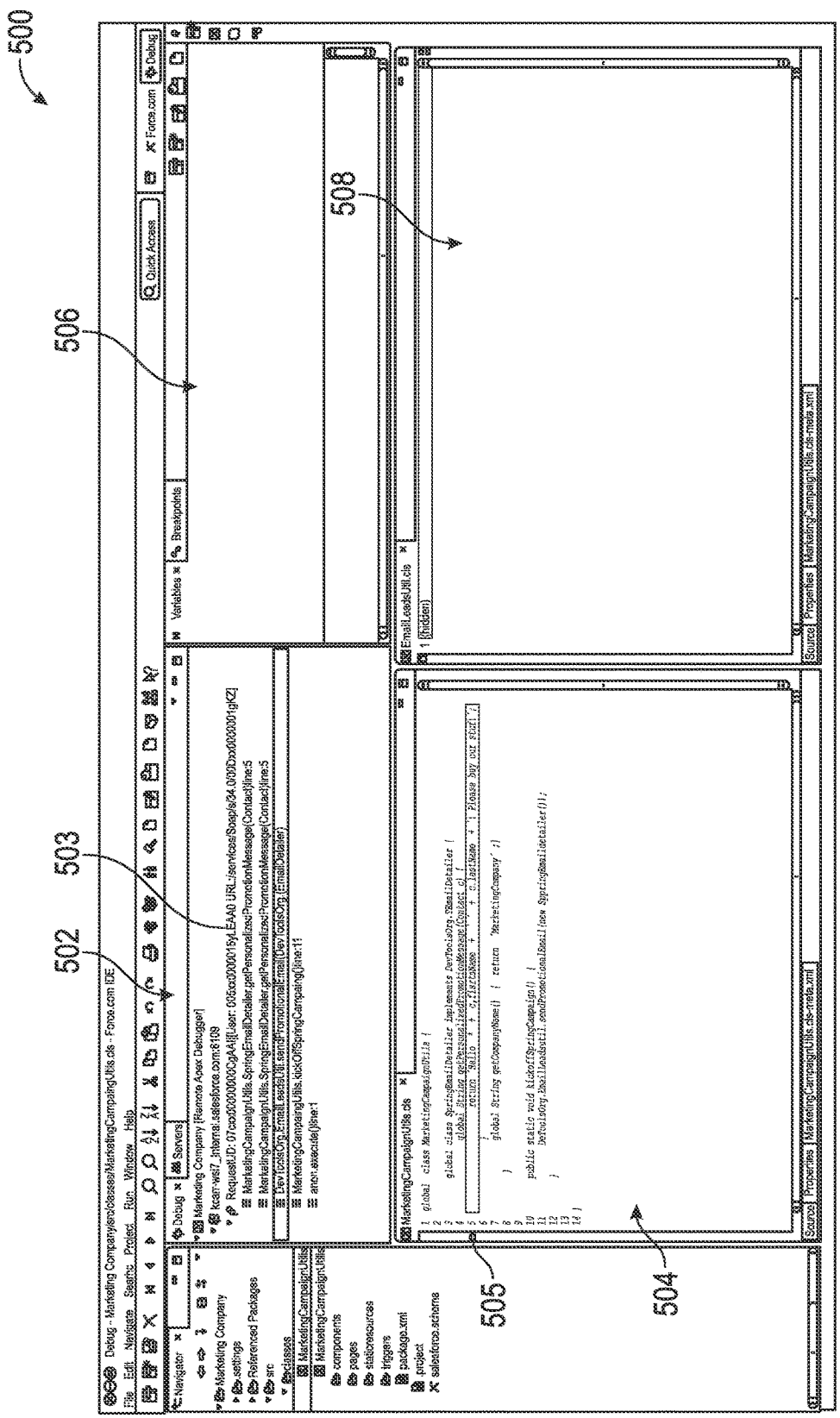
FIG. 5 illustrates an exemplary graphical user interface display that may be presented by a debugger on a client device in the on-demand multi-tenant database system of FIGS. 1 and 3 in connection with the debugging process of FIG. 4 in accordance with one or more exemplary embodiments.

FIG. 5 depicts a graphical user interface (GUI) display 500 that may be presented by the debugger 114 on the client device 106 based on debug execution information received from the debug API 316 associated with an instance of an application 304 being debugged. The illustrated GUI display 500 includes a first region 502 that includes a graphical representation of the current debug session thread 503 along with other information pertaining thereto and a second region 504 including a graphical representation of a portion of the tenant-specific application code 122 involved in the debugging session including a graphical representation 505 of any breakpoint inserted into the displayed portion of the tenant application code 122. The illustrated GUI display 500 also includes a region 506 for viewing the values for variables referenced by a particular line of the tenant-specific application code 122 currently under analysis along with a region 508 for viewing additional code referenced by the particular line of the tenant-specific application code 122. In this regard, the illustrated embodiment depicts a scenario where the protected code (e.g., platform application code 120 or other third-party code) is referenced by the tenant-specific application code 122. As described above, the protected code is redacted or otherwise removed from the debug execution information output by the debug API 316 (and potentially replaced with null values or other dummy data), so that it is hidden and not presented within the corresponding region 508 of the GUI display 500. Additionally, the values of variables utilized by the protected code are also redacted or otherwise removed from the debug execution information output by the debug API 316, so that they are also hidden and not presented within the corresponding region 506 of the GUI display 500. Thus, any protected code or data that should not be viewable to the user of the client device 106 is not provided to the debugger 114, and therefore, is not viewable to the user of the client device 106.

Figure 6:
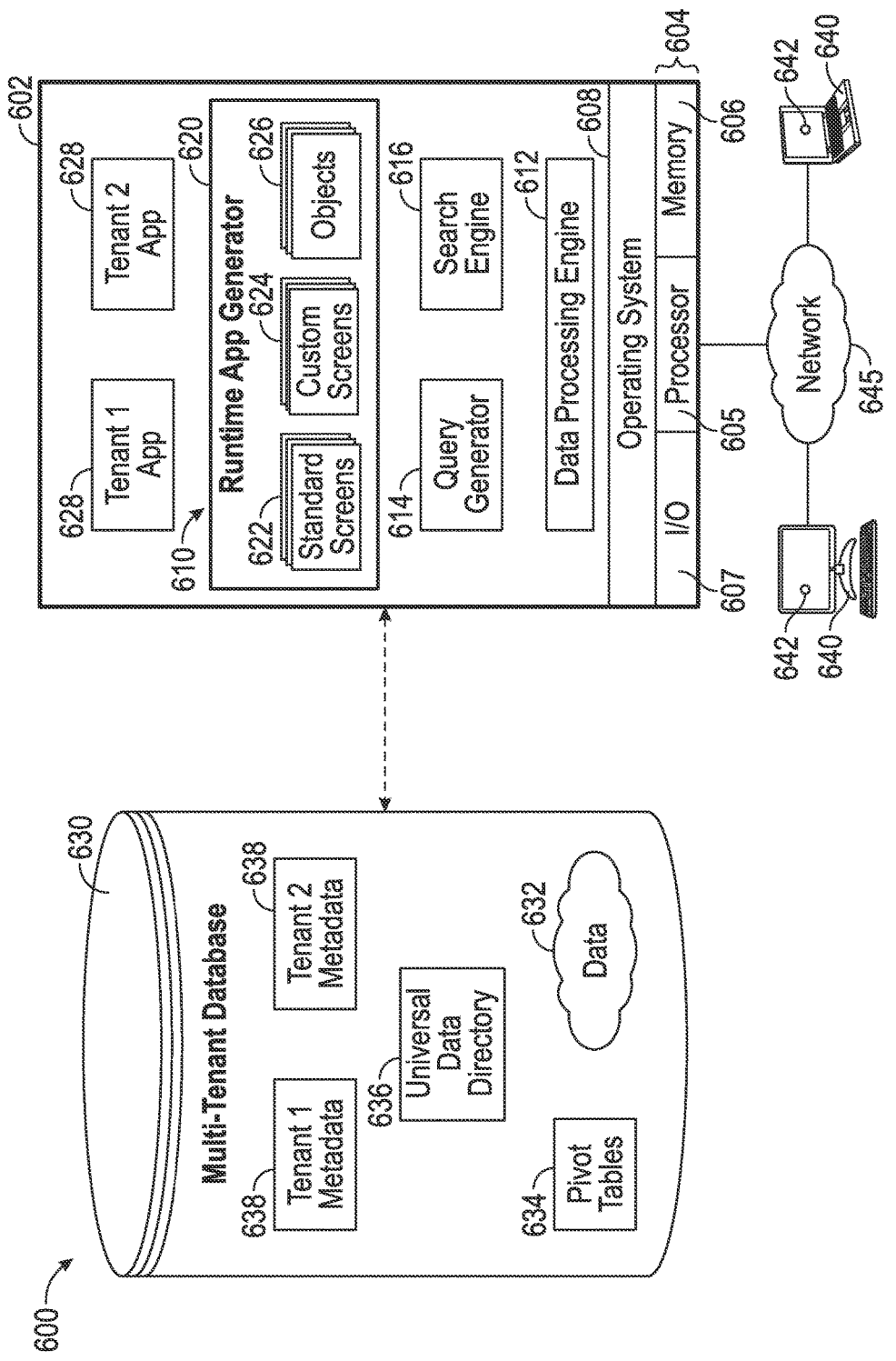
FIG. 6 is a block diagram of an exemplary multi-tenant system suitable for use as the on-demand multi-tenant database system of FIGS. 1 and 3 in accordance with one or more embodiments.

FIG. 6 depicts an exemplary embodiment of a multi-tenant system 600 suitable for use as the on-demand multi-tenant database system 100 of FIG. 1. The illustrated multi-tenant system 600 of FIG. 6 includes a server 602 (e.g., application server 102) that dynamically creates and supports virtual applications 628 based upon data 632 from a common database 630 (e.g., database 104) that is shared between multiple tenants, alternatively referred to herein as a multi-tenant database. Data and services generated by the virtual applications 628 are provided via a network 645 (e.g., network 108) to any number of client devices 640 (e.g., client device 106, or the like), as desired. Each virtual application 628 is suitably generated at run-time (or on-demand) using a common application platform 610 (e.g., application platform 112) that securely provides access to the data 632 in the database 630 for each of the various tenants subscribing to the multi-tenant system 600. In accordance with one non-limiting example, the multi-tenant system 600 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 630. In this regard, each tenant includes one or more users associated with, assigned to, or otherwise belonging to that respective tenant. To put it another way, each respective user within the multi-tenant system 600 is associated with, assigned to, or otherwise belongs to a particular tenant of the plurality of tenants supported by the multi-tenant system 600. Tenants may represent customers, customer departments, business or legal organizations, and/or any other entities that maintain data for particular sets of users within the multi-tenant system 600 (i.e., in the multi-tenant database 630). For example, the application server 602 may be associated with one or more tenants supported by the multi-tenant system 600. Although multiple tenants may share access to the server 602 and the database 630, the particular data and services provided from the server 602 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 632 belonging to or otherwise associated with other tenants.

The multi-tenant database 630 is any sort of repository or other data storage system capable of storing and managing the data 632 associated with any number of tenants. The database 630 may be implemented using any type of conventional database server hardware. In various embodiments, the database 630 shares processing hardware 604 with the server 602. In other embodiments, the database 630 is implemented using separate physical and/or virtual database server hardware that communicates with the server 602 to perform the various functions described herein. In an exemplary embodiment, the database 630 includes a database management system or other equivalent software capable of determining an optimal query plan for retrieving and providing a particular subset of the data 632 to an instance of virtual application 628 in response to a query initiated or otherwise provided by a virtual application 628. The multi-tenant database 630 may alternatively be referred to herein as an on-demand database, in that the multi-tenant database 630 provides (or is available to provide) data at run-time to on-demand virtual applications 628 generated by the application platform 610.

In practice, the data 632 may be organized and formatted in any manner to support the application platform 610. In various embodiments, the data 632 is suitably organized into a relatively small number of large data tables to maintain a semi-amorphous "heap"-type format. The data 632 can then be organized as needed for a particular virtual application 628. In various embodiments, conventional data relationships are established using any number of pivot tables 634 that establish indexing, uniqueness, relationships between entities, and/or other aspects of conventional database organization as desired. Further data manipulation and report formatting is generally performed at run-time using a variety of metadata constructs. Metadata within a universal data directory (UDD) 636, for example, can be used to describe any number of forms, reports, workflows, user access privileges, business logic and other constructs that are common to multiple tenants. Tenant-specific formatting, functions and other constructs may be maintained as tenant-specific metadata 638 for each tenant, as desired. Rather than forcing the data 632 into an inflexible global structure that is common to all tenants and applications, the database 630 is organized to be relatively amorphous, with the pivot tables 634 and the metadata 638 providing additional structure on an as-needed basis. To that end, the application platform 610 suitably uses the pivot tables 634 and/or the metadata 638 to generate "virtual" components of the virtual applications 628 to logically obtain, process, and present the relatively amorphous data 632 from the database 630.

The server 602 is implemented using one or more actual and/or virtual computing systems that collectively provide the dynamic application platform 610 for generating the virtual applications 628. For example, the server 602 may be implemented using a cluster of actual and/or virtual servers operating in conjunction with each other, typically in association with conventional network communications, cluster management, load balancing and other features as appropriate. The server 602 operates with any sort of conventional processing hardware 604, such as a processor 605, memory 606, input/output features 607 and the like. The input/output features 607 generally represent the interface(s) to networks (e.g., to the network 645, or any other local area, wide area or other network), mass storage, display devices, data entry devices and/or the like. The processor 605 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 606 represents any non-transitory short or long term storage or other computer-readable media capable of storing programming instructions for execution on the processor 605, including any sort of random access memory (RAM), read only memory (ROM), flash memory, magnetic or optical mass storage, and/or the like. The computer-executable programming instructions, when read and executed by the server 602 and/or processor 605, cause the server 602 and/or processor 605 to create, generate, or otherwise facilitate the application platform 610 and/or virtual applications 628 and perform one or more additional tasks, operations, functions, and/or processes described herein. It should be noted that the memory 606 represents one suitable implementation of such computer-readable media, and alternatively or additionally, the server 602 could receive and cooperate with external computer-readable media that is realized as a portable or mobile component or application platform, e.g., a portable hard drive, a USB flash drive, an optical disc, or the like.

The application platform 610 is any sort of software application or other data processing engine that generates the virtual applications 628 that provide data and/or services to the client devices 640. In a typical embodiment, the application platform 610 gains access to processing resources, communications interfaces and other features of the processing hardware 604 using any sort of conventional or proprietary operating system 608. The virtual applications 628 are typically generated at run-time in response to input received from the client devices 640. For the illustrated embodiment, the application platform 610 includes a bulk data processing engine 612, a query generator 614, a search engine 616 that provides text indexing and other search functionality, and a runtime application generator 620. Each of these features may be implemented as a separate process or other module, and many equivalent embodiments could include different and/or additional features, components or other modules as desired.

The runtime application generator 620 dynamically builds and executes the virtual applications 628 in response to specific requests received from the client devices 640. The virtual applications 628 are typically constructed in accordance with the tenant-specific metadata 638, which describes the particular tables, reports, interfaces and/or other features of the particular application 628. In various embodiments, each virtual application 628 generates dynamic web content that can be served to a browser or other client program 642 associated with its client device 640, as appropriate.

The runtime application generator 620 suitably interacts with the query generator 614 to efficiently obtain multi-tenant data 632 from the database 630 as needed in response to input queries initiated or otherwise provided by users of the client devices 640. In a typical embodiment, the query generator 614 considers the identity of the user requesting a particular function (along with the user's associated tenant), and then builds and executes queries to the database 630 using system-wide metadata 636, tenant specific metadata 638, pivot tables 634, and/or any other available resources. The query generator 614 in this example therefore maintains security of the common database 630 by ensuring that queries are consistent with access privileges granted to the user and/or tenant that initiated the request. In this manner, the query generator 614 suitably obtains requested subsets of data 632 accessible to a user and/or tenant from the database 630 as needed to populate the tables, reports or other features of the particular virtual application 628 for that user and/or tenant.

Still referring to FIG. 6, the data processing engine 612 performs bulk processing operations on the data 632 such as uploads or downloads, updates, online transaction processing, and/or the like. In many embodiments, less urgent bulk processing of the data 632 can be scheduled to occur as processing resources become available, thereby giving priority to more urgent data processing by the query generator 614, the search engine 616, the virtual applications 628, etc.

In exemplary embodiments, the application platform 610 is utilized to create and/or generate data-driven virtual applications 628 for the tenants that they support. Such virtual applications 628 may make use of interface features such as custom (or tenant-specific) screens 624, standard (or universal) screens 622 or the like. Any number of custom and/or standard objects 626 may also be available for integration into tenant-developed virtual applications 628. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 626 such as "account" objects, "opportunity" objects, "contact" objects, or the like. The data 632 associated with each virtual application 628 is provided to the database 630, as appropriate, and stored until it is requested or is otherwise needed, along with the metadata 638 that describes the particular features (e.g., reports, tables, functions, objects, fields, formulas, code, etc.) of that particular virtual application 628. For example, a virtual application 628 may include a number of objects 626 accessible to a tenant, wherein for each object 626 accessible to the tenant, information pertaining to its object type along with values for various fields associated with that respective object type are maintained as metadata 638 in the database 630. In this regard, the object type defines the structure (e.g., the formatting, functions and other constructs) of each respective object 626 and the various fields associated therewith.

Still referring to FIG. 6, the data and services provided by the server 602 can be retrieved using any sort of personal computer, mobile telephone, tablet or other network-enabled client device 640 on the network 645. In an exemplary embodiment, the client device 640 includes a display device, such as a monitor, screen, or another conventional electronic display capable of graphically presenting data and/or information retrieved from the multi-tenant database 630. Typically, the user operates a conventional browser application or other client program 642 executed by the client device 640 to contact the server 602 via the network 645 using a networking protocol, such as the hypertext transport protocol (HTTP) or the like. The user typically authenticates his or her identity to the server 602 to obtain a session identifier ("SessionID") that identifies the user in subsequent communications with the server 602. When the identified user requests access to a virtual application 628, the runtime application generator 620 suitably creates the application at run time based upon the metadata 638, as appropriate. As noted above, the virtual application 628 may contain Java, ActiveX, or other content that can be presented using conventional client software running on the client device 640; other embodiments may simply provide dynamic web or other content that can be presented and viewed by the user, as desired.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to multi-tenancy, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method of real-time debugging of an instance of a virtual application generated at run-time based at least in part on an application code in a database coupled to a plurality of application servers, the method comprising: receiving, by a first application server of the plurality of application servers, a client request associated with the application code in the database from the instance of the virtual application provided by the first application server to a client device via a network; verifying, by the first application server, creation of an active debugging session associated with the client request does not violate a debugging utilization criterion; and after verifying that the active debugging session does not violate the debugging utilization criterion: creating, by the first application server, an entry in a debug mapping table in the database to maintain an association between the instance of the virtual application from which client request originated, a network address associated with a debugger, and the first application server providing the instance of the virtual application to the client device; and providing, by the first application server via the network to the network address associated with the debugger associated with the active debugging session, execution information associated with at least a portion of the application code in the database when execution of the application code by the first application server providing the instance of the virtual application stops, the execution information corresponding to a current execution state of the instance of the virtual application provided by the first application server to the client device; receiving, at a second application server of the plurality of application servers, a debugging request received from the debugger; redirecting, by the second application server, the debugging request received from the debugger to the first application server after accessing the debug mapping table and determining the debugging request pertains to the instance of the virtual application executing on the first application server based on the association between the active debugging session and the first application server; executing, by the first application server, the portion of the application code in response to the debugging request to resume performance of the client request; and providing, by the first application server to the debugger via the network, second execution information pertaining to an execution state of the instance of the virtual application corresponding to the first application server executing the portion of the application code as a response to the debugging request.

2. The method of claim 1, further comprising:
receiving a debug session request from the debugger on a second client device; and
inserting, by the first application server, one or more breakpoints in the application code in response to user input received from the debugger.

3. The method of claim 2, wherein verifying that the client request does not violate the debugging utilization criterion comprises verifying a current number of active debugging sessions associated with a user of the second client device is less than a maximum number of concurrent active debugging sessions.

4. The method of claim 2, wherein verifying that the client request does not violate the debugging utilization criterion comprises verifying a current resource usage associated with a user of the second client device is less than a threshold resource usage.

5. The method of claim 2, further comprising:
instantiating, by the first application server, the active debugging session corresponding to the debug session request in the database after verifying that the debug session request does not violate the debugging utilization criterion; and
terminating the active debugging session after a threshold period of time has elapsed since receiving the debug session request.

6. The method of claim 1, further comprising:
identifying, by the first application server, the active debugging session corresponding to the client request; and
notifying, by the first application server, the debugger on a second client device based on an association between the active debugging session and the debugger.

7. The method of claim 1, wherein providing the execution information comprises the first application server removing protected information associated with execution of the portion of the application code prior to providing the execution information to the debugger.

8. A method of debugging an application code associated with a first tenant of a plurality of tenants in a database of a multi-tenant database system supporting the plurality of tenants, the method comprising: receiving, by the multi-tenant database system, a debug request associated with the application code in the database from a debugger on a first client device via a network; verifying, by the multi-tenant database system, that the debug request does not violate a debugging utilization criterion; after verifying that the debug request does not violate the debugging utilization criterion: updating the database to instantiate an active debugging session associated with the debugger and the application code; receiving, by a first application server of a plurality of application servers of the multi-tenant database system, a client request associated with the application code in the database from an instance of a client application on a second client device via the network, wherein the first application server generates the instance of the client application at run-time based at least in part on the application code; and in response to determining the client request corresponds to the active debugging session:

creating, by the first application server, an entry in the debug mapping table in the database to maintain an association between the instance of the client application from which client request originated, a network address associated with a debugger, and the first application server providing the instance of the virtual application to the client device; and providing, by the multi-tenant database system via the network to the network address associated with the debugger associated with the active debugging session, execution information pertaining to the client request based on the association between the debugger and the active debugging session, the execution information corresponding to a current execution state of the instance of the client application provided by the first application server to the client device when execution of the application code by the first application server providing the instance of the client application stops; receiving, by a second application server of the plurality of application servers, a debugging execution request corresponding to the client request from the debugger on the first client device via the network; redirecting, by the second application server, the debugging execution request received from the debugger to the first application server after accessing the debug mapping table and determining the debugging execution request pertains to the instance of the virtual application executing on the first application server based on an association between the active debugging session and the first application server; executing, by the first application server, at least a portion of the application code based on the client request to resume performance of the client request in accordance with the debugging execution request; and providing, by the first application server to the debugger on the first client device, second execution information pertaining to an execution state of the instance of the client application corresponding to the first application server executing at least the portion of the application code as a response to the debugging request.

9. The method of claim 8, wherein providing the debugger with execution information comprises removing protected information associated with execution of the client request prior to providing the execution information to the debugger.

10. The method of claim 8, wherein providing the debugger with execution information pertaining to the client request comprises allowing the debugger to step through execution of the client request by the multi-tenant database system.

11. The method of claim 8, wherein verifying that the debug request does not violate the debugging utilization criterion comprises verifying a number of active debugging sessions associated with the first tenant is less than a maximum number of concurrent active debugging sessions for the first tenant.

12. The method of claim 8, wherein verifying that the debug request does not violate the debugging utilization criterion comprises verifying a resource usage metric associated with the first tenant is less than a threshold usage.

13. The method of claim 8, the debugger being associated with a user associated with the first tenant, wherein verifying that the debug request does not violate the debugging utilization criterion comprises verifying a number of active debugging sessions associated with the user is less than a threshold number.

14. A multi-tenant database system comprising: a database to maintain application code associated with a first tenant of a plurality of tenants and including a debug mapping table maintaining an association between the application code and a debugging session associated with a debugger; and a plurality of application servers coupled to the database and a network to receive a client request associated with the application code in the database via the network from an instance of a virtual application generated at run-time based at least in part on the application code at a first application server of the plurality of application servers, verify associating the client request with the debugging session does not violate a debugging utilization criterion, update the debug mapping table in the database to maintain an association between the debugging session, the instance of the virtual application from which client request originated, and the first application server, provide execution information corresponding to a current execution state of the instance of the virtual application provided by the first application server when execution of the application code stops to a network address associated with the debugger via the network based on the association between the application code and the debugging session, and redirect a debugging execution request received from the debugger via the network at a second application server to the first application server after accessing the debug mapping table and determining the debugging request pertains to the instance of the virtual application executing on the first application server based on the association between the debugging session and the first application server in the database, wherein the first application server executes a portion of the application code in response to the debugging request to resume performance of the client request in accordance with the debugging execution request and provides second execution information pertaining to an execution state of the instance of the virtual application corresponding to the first application server executing the portion of the application code to the debugger via the network as a response to the debugging execution request.

15. The multi-tenant database system of claim 14, wherein:
    the database maintains a breakpoint associated with the application code for the debugging session; and
    the first application server notifies the debugger via the network in response to execution of the client request encountering the breakpoint and executes the portion of the application code following the breakpoint in accordance with the debugging execution request received from the second application server via the network.

16. The multi-tenant database system of claim 15, wherein the first application server provides the second execution information corresponding to executing the portion of the application code following the breakpoint to the debugger via the network.

17. The multi-tenant database system of claim 14, further comprising a load balancer to receive the debugging execution request and direct the debugging execution request to the second application server, wherein a debug application program interface at the second application server determines the debugging execution request pertains to the instance of the virtual application executing on the first application server based on the association between the debugging session and the first application server and forwards the debugging execution request to the first application server.

18. The method of claim 1, wherein:
redirecting the debugging request comprises the second application server providing a debugging execution request to the first application server associated with an instance of execution of the application code being debugged; and
executing the portion of the application code in response to the debugging request comprises the first application server executing at least a portion of the application code in accordance with the debugging execution request.

19. The method of claim 1, further comprising detecting, by the first application server, the client request matches the active debugging session maintained in the debug mapping table in the database, wherein:
the debug mapping table maintains an association between the active debugging session and the network address associated with the debugger; and
providing the execution information to the debugger comprises providing a notification including the execution information to the network address associated with the active debugging session.

20. The method of claim 1, wherein providing the execution information comprises the first application server providing a notification to the debugger when execution of the application code encounters a breakpoint that pauses execution of the instance of the virtual application.

\* \* \* \* \*